US011622146B2

United States Patent
Comito et al.

(10) Patent No.: US 11,622,146 B2
(45) Date of Patent: Apr. 4, 2023

(54) GUIDED INTERACTION BETWEEN A COMPANION DEVICE AND A USER

(71) Applicant: Disney Enterprises, Inc., Burbank, CA (US)

(72) Inventors: Keith Comito, Seaford, NY (US); Dirk Van Dall, Shelter Island, NY (US); James Bowers, Durham, NC (US); Anthony Waters, Prospect, CT (US); Thomas Engel, Haarlem (NL)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/064,235

(22) Filed: Oct. 6, 2020

(65) Prior Publication Data
US 2022/0109905 A1 Apr. 7, 2022

(51) Int. Cl.
| | |
|---|---|
| H04N 21/43 | (2011.01) |
| H04N 21/8547 | (2011.01) |
| G11B 27/10 | (2006.01) |
| H04N 21/41 | (2011.01) |

(52) U.S. Cl.
CPC ......... *H04N 21/4302* (2013.01); *G11B 27/10* (2013.01); *H04N 21/4104* (2013.01); *H04N 21/8547* (2013.01)

(58) Field of Classification Search
CPC ........... H04N 21/4302; H04N 21/4104; H04N 21/8547; H04N 5/04; H04N 5/05; H04N 5/06; H04N 5/0736; H04N 5/08; G11B 27/10

USPC .......................................................... 386/201
See application file for complete search history.

(56) References Cited

U.S. PATENT DOCUMENTS

| | | | |
|---|---|---|---|
| 2004/0030741 A1* | 2/2004 | Wolton ................. | G06F 16/954 709/202 |
| 2012/0011550 A1* | 1/2012 | Holland ............. | H04N 21/4122 725/78 |
| 2012/0157206 A1* | 6/2012 | Crevin .................... | A63F 13/98 463/36 |
| 2014/0195653 A1* | 7/2014 | Alexander ......... | H04N 21/4347 709/219 |

(Continued)

OTHER PUBLICATIONS

"Amiibo" (Wikipedia 2020). https://en.wikipedia.org/wiki/Amiibo.
(Continued)

*Primary Examiner* — Thai Q Tran
*Assistant Examiner* — Nienru Yang
(74) *Attorney, Agent, or Firm* — Farjami & Farjami LLP

(57) ABSTRACT

According to one implementation, a method of guiding an interaction between a companion module and a user includes identifying a media content for playout by a media player device, transmitting, to a remote server, an interaction schema request identifying the media content and the companion module, and receiving, from the remote server, behavioral manifest data including an instruction for guiding the interaction between the companion module and the user. Such a method also includes obtaining a play head state of the media player device and a playout timecode state of the media content, and identifying a user interaction behavior for the companion module based on the behavioral manifest data, the play head state of the media player device, and the playout timecode state of the media content.

18 Claims, 8 Drawing Sheets

(56) References Cited

U.S. PATENT DOCUMENTS

2015/0264722 A1* 9/2015 Cheng .................. H04W 8/005
                                                             455/41.2
2020/0260154 A1   8/2020 Comito et al.

OTHER PUBLICATIONS

"Captain Power and the Soldiers of the Future" (Wikipedia 2020). https://en.wikipedia.org/wiki/Captain_Power_and_the_Soldiers_of_the_Future.
"Disney Frozen 2 Elsa Interactive Figure" (Walmart.com 2020). https://www.walmart.com/ip/Disney-Frozen-2-Elsa-Interactive-Figure/209421061.
"Furby" (Wikipedia 2020). https://en.wikipedia.org/wiki/Furby/.
"Light gun" (Wikipedia 2020). https://en.wikipedia.org/wiki/Light_gun.
"Skylanders" (Wikipedia 2020). https://en.wikipedia.org/wiki/Skylanders.
"Teddy Ruxpin" (Wikipedia 2020). https://en.wikipedia.org/wiki/Teddy_Ruxpin.
"Toys-to-life" (Wikipedia 2020). haps://en.wikipedia.org/wiki/Toys-to-life.

* cited by examiner

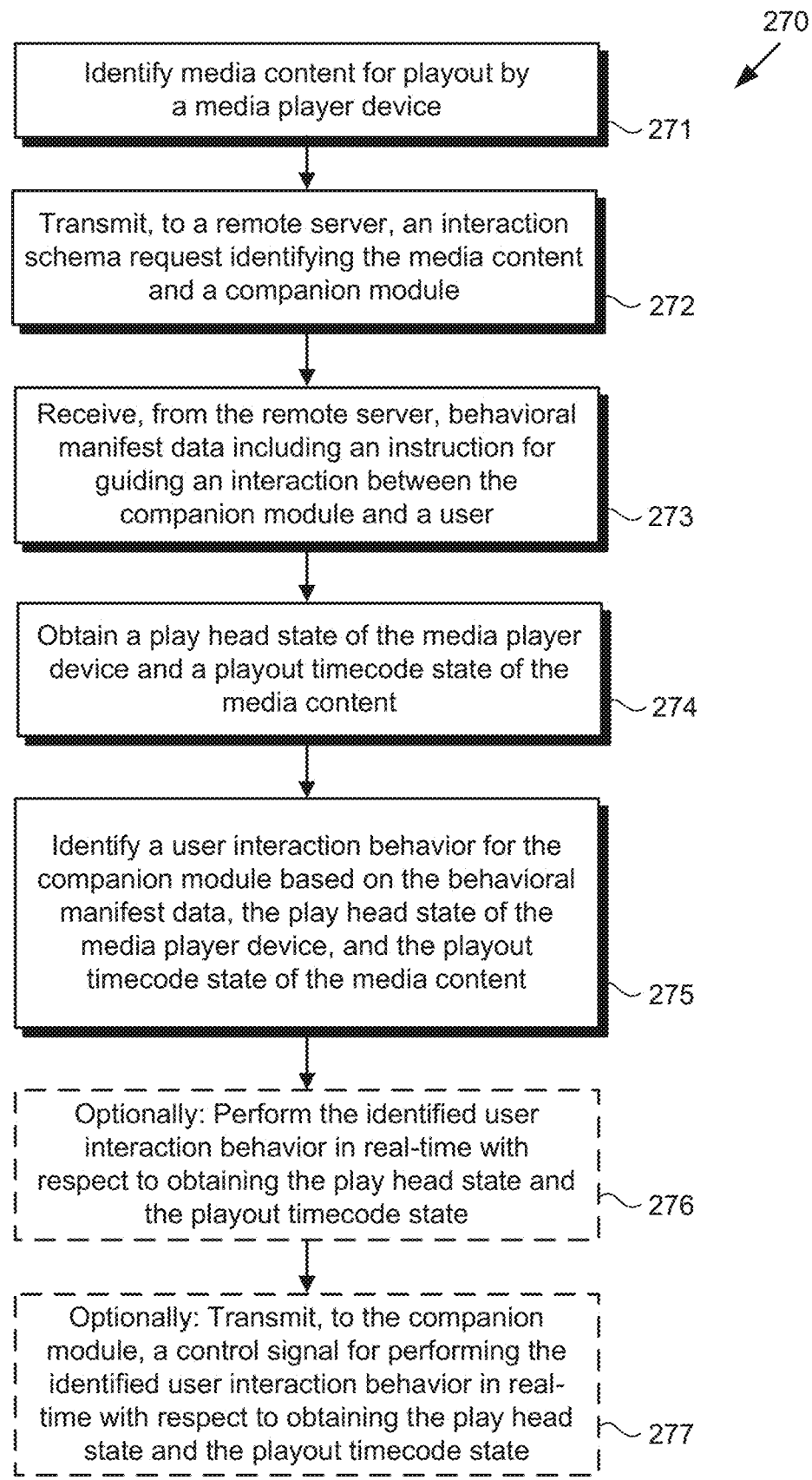

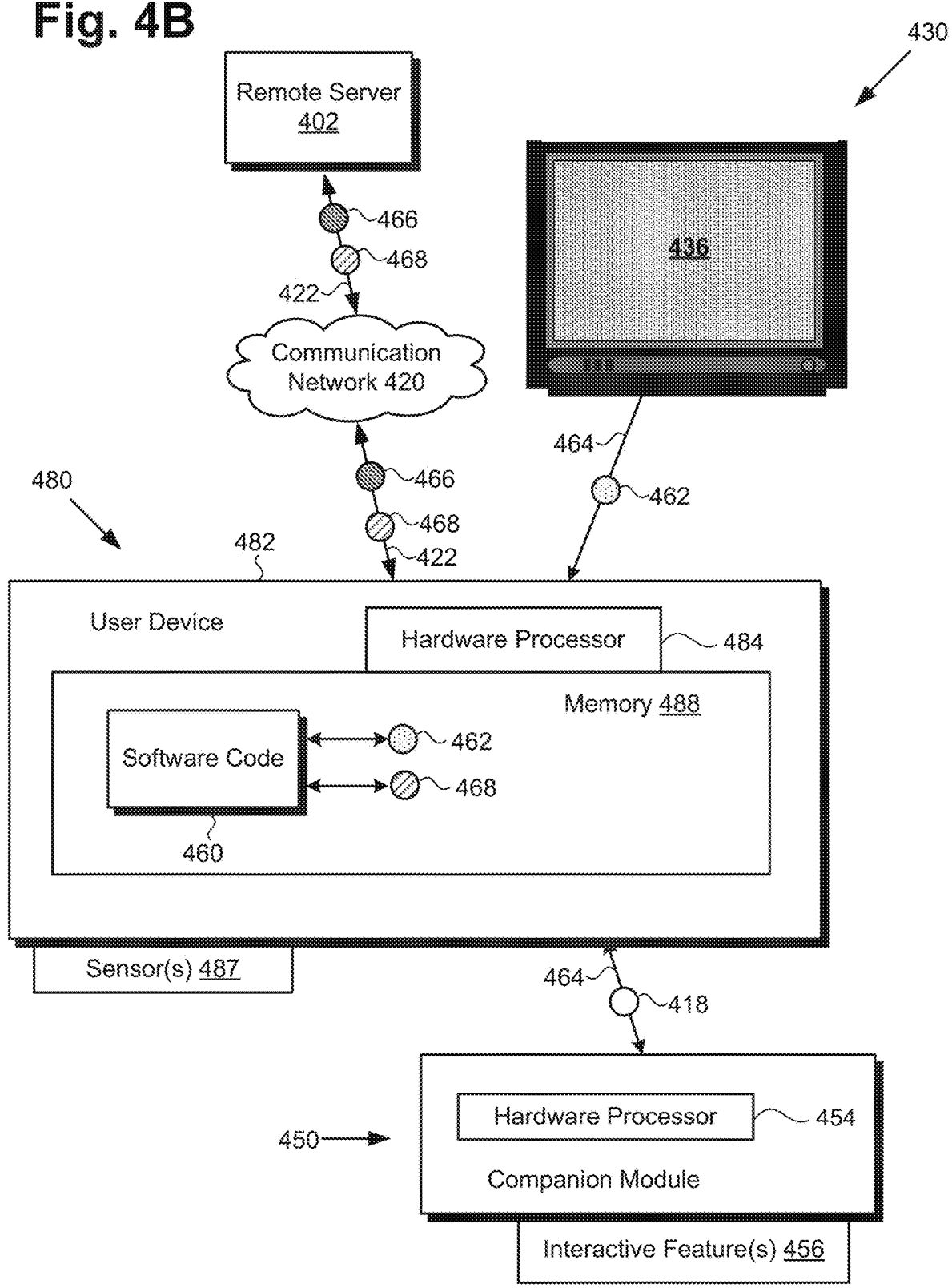

GUIDED INTERACTION BETWEEN A COMPANION DEVICE AND A USER

BACKGROUND

Animated television (TV) characters like the Blue Falcons's assistant Dynomutt, Rosie the robot from the Jetsons, and Robo-Dog from the series PAW Patrol testify to the enduring human fascination with the concept of mechanical companionship. In addition, the commonplace actions of children at play, such as dancing with a doll while listening to music, or speaking to a toy while watching TV, reveal the basic desire to share meaningful experiences with a toy based not just on the child's own actions, but also in relation to external stimuli.

The electronics and toy industries have attempted to respond to the desire for mechanical companionship with a variety of products. Accordingly, there is a need in the art for a solution enabling a device or virtual entity to engage in real-time interactions with a user and media content.

BRIEF DESCRIPTION OF THE DRAWINGS

FIG. 2 shows a flowchart presenting an exemplary method for guiding interactions between a companion module and a user, according to one implementation;

FIG. 4B shows a more detailed exemplary representation of the companion module and the user device included in the system of FIG. 4A, according to one implementation.

DETAILED DESCRIPTION

Figure 1A:
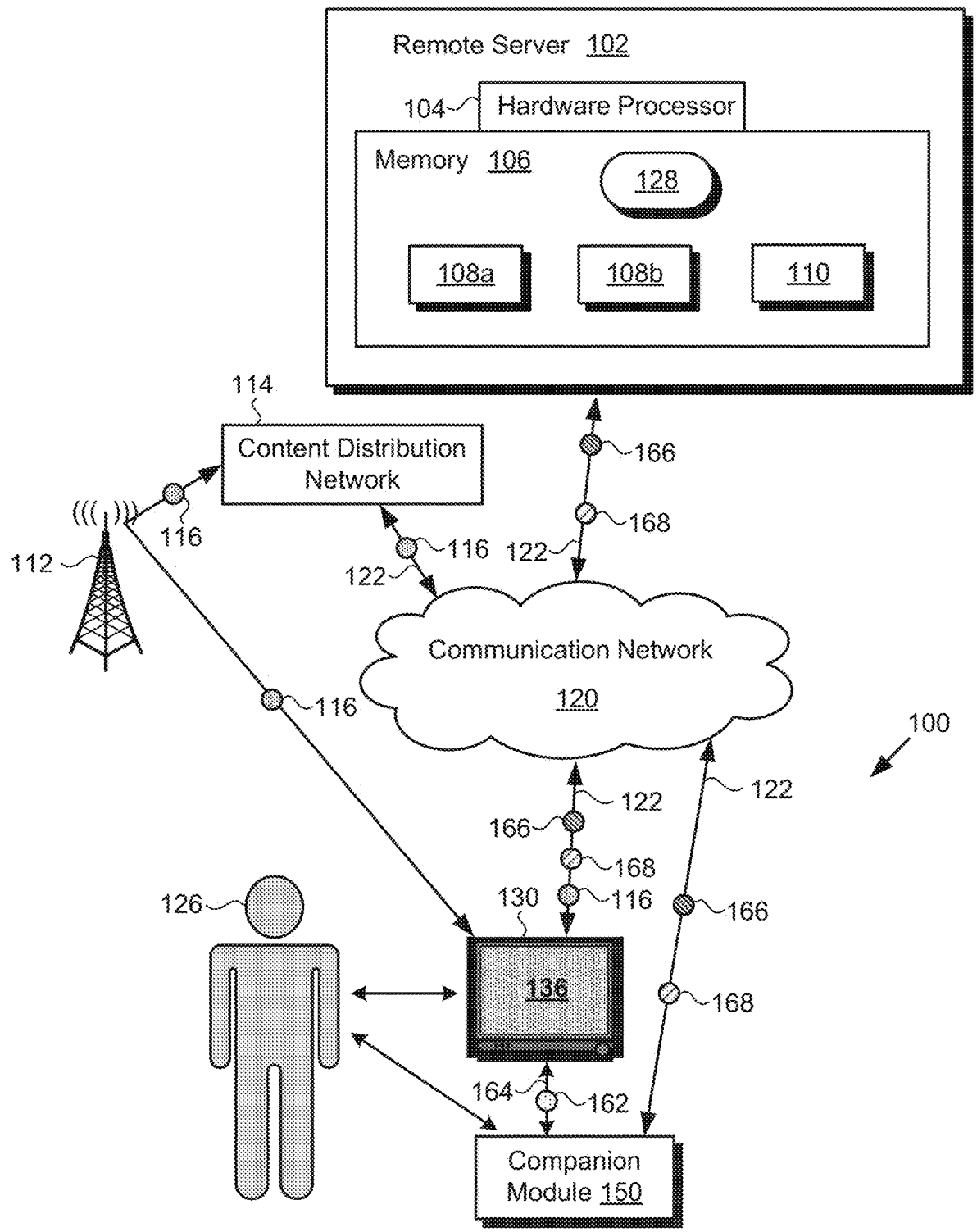
FIG. 1A shows an exemplary system for guiding interactions between a companion module and a user, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for guiding interactions between a companion module, a user, and various types of media content, and more specifically, enabling the companion module to engage in real-time interactions with a user and media content that are adaptable, context appropriate, and apparently spontaneous. Conventional product offerings suffer from one or more of several significant shortcomings. Those shortcomings include lack of complex interaction behavior by the product, inability of the product to adapt its interactions in response to media content, lack of bi-directional interaction of the product with media content, and lack of synchronized real-time interaction behavior with media content with which the product interacts. The present systems and methods described herein address and overcome the aforementioned deficiencies in the art.

In some implementations, the systems and methods disclosed by the present application may be substantially or fully automated. It is noted that, as used in the present application, the terms "automation," "automated," and "automating" refer to systems and processes that do not require the participation of a human system operator. Thus, the methods described in the present application may be performed under the control of hardware processing components of the disclosed automated systems.

FIG. 1A shows exemplary system 100 for guiding interactions between a companion module and a user, according to one implementation. As shown in FIG. 1A, system 100 may include exemplary media player device 130 coupled to or having output device 136, shown as an exemplary display in FIG. 1A, and companion module 150 configured to be communicatively coupled to media player device 130 by local wireless communication link 164.

As further shown in FIG. 1A, system 100 is implemented within a use environment including content source 112 providing media content 116 for delivery to media player device 130, either as a direct linear television (TV) broadcast to media player device 130, or for delivery via content distribution network 114 and communication network 120. The use environment also includes remote computer server 102 (hereinafter "remote server 102") accessible to media player device 130 and companion module 150 via communication network 120. Remote server 102 includes hardware processor 104 and memory 106 implemented as a non-transitory storage device storing interaction schemas 108a, 108b, and 110. Also shown in FIG. 1A is user 126 of media player device 130 and companion module 150, user profile 128 of user 126 that may optionally be stored on remote server 102, network communication links 122 of communication network 120, interaction schema request 166, behavioral manifest data 168, and media playout status metadata 162.

As discussed in greater detail below, according to the exemplary implementation shown in FIG. 1A, system 100 is configured to guide interactions between companion module 150 and user 126 based on behavioral manifest data 168 and one or more of: actions performed by user 126, known preferences of user 126 or other user related metadata stored in user profile 128 of user 126, features of companion module 150, attributes of media content 116, and a playout status of media content 116. System 100 guides the interactions between companion module 150 and user 126 as a supplement to media content 116 during consumption of media content 116 by user 126. By guiding interactions between companion module 150 and user 126 while media content 116 is played out, system 100 can advantageously provide user 126 with a more engaging and immersive enhanced media content consumption experience.

Content source 112 may be a media entity providing media content 116 in the form of audio content and video content. For example, media content 116 may be music content. Alternatively, media content 116 may include frames of video from a video game, movie, or a linear TV program stream, for example. Such movie or TV video content may include a high-definition (HD) or ultra-HD (UHD) baseband video signal with embedded audio, captions, time code, and other ancillary metadata, such as ratings and parental guidelines. In some implementations, media content 116 provided by content source 112 may include multiple audio tracks, and may utilize secondary audio programming (SAP) and Descriptive Video Service (DVS), for example.

Media content 116 provided by content source 112 may be the same source video that is broadcast to a traditional TV audience. Thus, content source 112 may take the form of a conventional cable and satellite TV network, for example. As depicted in FIG. 1A, content source 112 may find it advantageous or desirable to make media content 116 available via an alternative distribution channel, such as communication network 120, which may take the form of a packet-switched network, for example, such as the Internet. For instance, content distribution network 114 may be utilized by content source 112 to distribute media content 116 as part of a program stream, which may be an Internet Protocol (IP) programming stream provided by a streaming service, or a video-on-demand (VOD) service.

Behavioral manifest data 168 includes one or more instructions included in one of interaction schemas 108a, 108b, or 110 for guiding the interaction between companion module 150 and user 126 that are conditional on one or more of the factors described above, i.e., actions performed by user 126, known preferences of user 126 or other user related metadata stored in user profile 128 of user 126, features of companion module 150, attributes of media content 116, and a playout status of media content 116. Each of interaction schemas 108a, 108b, and 110 may include a complete script for interactions between companion module 150 and user 126 during playout of media content 116 by media player device 130.

It is noted that, as used in the present application, the expression "companion module" refers to any of a wide variety of devices, systems, or software modules capable of producing outputs that simulate interactive behaviors. Those interactive behaviors may include one or more of changes in lighting, sound effects, haptic effects, speech, and movement, for example. Specific examples of companion module 150 when companion module 150 is implemented as a companion device or system include an audio speaker or system, a lighting element or system, a toy, handheld device, or robot, or a projection device, such as a holographic projector, to name a few. Thus, in some implementations, companion module 150 can be a physical device or a hardware component of a physical device that is separate from media player device 130 (e.g. a physical toy or user device other than media player device 130 currently playing out media content 116 at the time of the interaction). Alternatively, companion module 150 may be implemented as a software module within a device or system, such as augmented reality (AR) glasses or goggles, a virtual reality (VR) headset, or a holographic projector, for example, that is separate from the media player application playing out media content 116. That is to say, companion module 150 may be a module of code for rendering AR or VR content based on interaction schemas 108a, 108b, or 110, and existing outside of media player device 130. In those implementations companion module 150 contains instructions for executing the interactive behavior based on the interaction schema. Moreover, in some implementations, companion module 150 may contain instructions for rendering of a virtual companion that appears to perform the interactive behavior upon the companion module receiving a control signal and the AR/VR device or holographic projector executing the instructions to render and display an animation of the virtual companion that corresponds to the interactive behavior.

In some use cases, it may be advantageous or desirable to have alternative versions of an interaction schema directed to the same media content but differing based on actions by user 126, known preferences of user 126 or other user related metadata stored in user profile 128 of user 126, or the features and capabilities of companion module 150. For example, interaction schema 108a may be directed to media content 116 and may be utilized in use cases in which companion module 150 is a smart device having data processing capabilities sufficient to support communications with remote server 102 and to control its own interactive features. By contrast, interaction schema 108b, while also being directed to media content 116, may be utilized in use cases in which companion module 150 is not a smart device, but one that lacks data processing capabilities enabling communications with remote server 102 and is instead controlled by media player device 130.

In other use cases, it may be advantageous or desirable to include all versions of an interaction schema included as alternative instructions within a single consolidated interaction schema, such as interaction schema 110. In implementations in which interaction schema 110 takes the form of a consolidated interaction schema including alternative instructions, interaction schema 110 is effectively a general behavior guideline for interactions between companion module 150 and user 126 that is utilized in conjunction with real-time media playout status metadata 162.

In some implementations, behavioral manifest data 168 may include one of interaction schemas 108a, 108b, or 110 in its entirety, such as in the form of a download via communication network 120, for example. However, in other implementations, behavioral manifest data 168 may be transmitted in real-time synchronization with respect to the playout status of media content 116 by media player device 130. It is noted that the playout status of media content 116 by media player device 130 may be identified based on metadata describing the play head state of media player device 130, e.g., play, pause, stop, fast-forward, reverse, and playout speed of media player device 130, as well as describing the present playout timecode state of media content 116.

It is further noted that, in some implementations, interaction schemas 108a, 108b, and 110 may be updateable in real-time. For example, in some implementations, the content of one or more of behavioral schemas 108a, 108b, and 110 may be updated based on the sensed environment of companion module 150, such as temperature, lighting, or outdoor weather conditions, for example, or the tastes and preferences of user 126 that are stored in user profile 128. Alternatively, or in addition, one or more of behavioral schemas 108a. 108b, and 110 may be updated based on the trending actions of other consumers of media content 116, unknown to user 126, but trackable by system 100. As a result, companion device 130 may respond to the same media playout status metadata 162 with a different one or more of interactive feature(s) 156 (e.g. same exact companion module 150, media content 116, and present timecode state of media content 116, but something externally has changed so companion module reacts with a different response).

In implementations in which companion module 150 is a smart device, as described below by reference to FIG. 1B, companion module 150 may transmit interaction schema request 166 identifying media content 116 and companion module 150 to remote server 102, and may receive behavioral manifest data 168 from remote server 102 via communication network 120. Alternatively, in implementations in which companion module 150 lacks smart device capability, as described below by reference to FIG. 1C. media player device 130 may transmit interaction schema request 166 identifying media content 116 and companion module 150 to remote server 102, may receive behavioral manifest data 168 from remote server 102 via communication network 120, and may control interactive behaviors by companion module 150 via local wireless communication link 164.

In some implementations, remote server 102 may correspond to one or more web servers accessible over a packet-switched network such as the Internet, for example, as noted above. Alternatively, remote server 102 may correspond to one or more computer servers supporting a wide area network (WAN), a local area network (LAN), or included in another type of private or limited distribution network. Local wireless communication link 164 may be a Bluetooth link, such as a Bluetooth Low Energy (Bluetooth LE) link, or may be wireless communication link implemented using WiFi, ZigBee, or 60 GHz wireless communications protocols.

It is noted that, although media player device 130 is shown as a smart TV in FIG. 1A, that representation is provided merely by way of example. In other implementations, media player device 130 may take the form of any suitable mobile or stationary computing device or system that implements data processing capabilities sufficient to provide a user interface, support connections to communication network 120, and implement the functionality ascribed to media player device 130 herein. That is to say, in other implementations, media player device 130 may take the form of a desktop computer, laptop computer, tablet computer, smartphone, digital media player, game console, a wearable communication device such as a smartwatch, or as an audio sound system lacking output device 136, to name a few examples.

It is further noted that, although output device 136 is shown as a display in FIG. 1A, that representation is provided merely by way of example. In other implementations, output device 136 may take the form of one or more audio speakers, one or more lighting elements, one or more haptic devices, or any combination of displays, audio speakers, lighting elements, and haptic devices. In implementations in which media player device 130 includes output device 136 in the form of a display, the display may take the form of a liquid crystal display (LCD), light-emitting diode (LED) display, organic light-emitting diode (OLED) display, quantum dot (QD) display, or any other suitable display screen that performs a physical transformation of signals to light.

It is also noted that, in various implementations, output device 136 may be physically integrated with media player device 130 or may be communicatively coupled to but physically separate from media player device 130. For example, where media player device 130 is implemented as a smartphone, laptop computer, or tablet computer, output device 136 will typically be integrated with media player device 130. By contrast, where media player device 130 is implemented as a desktop computer, output device 136 may take the form of a monitor or audio speaker separate from media player device 130 in the form of a computer tower. In other examples, media player device 130 may be a streaming media device for accessing and playing back streaming media through one or more streaming content applications provided by one or more content providers, and output device 136 may take the form of one or more displays, one or more audio output devices, or combinations thereof.

Figure 1B:
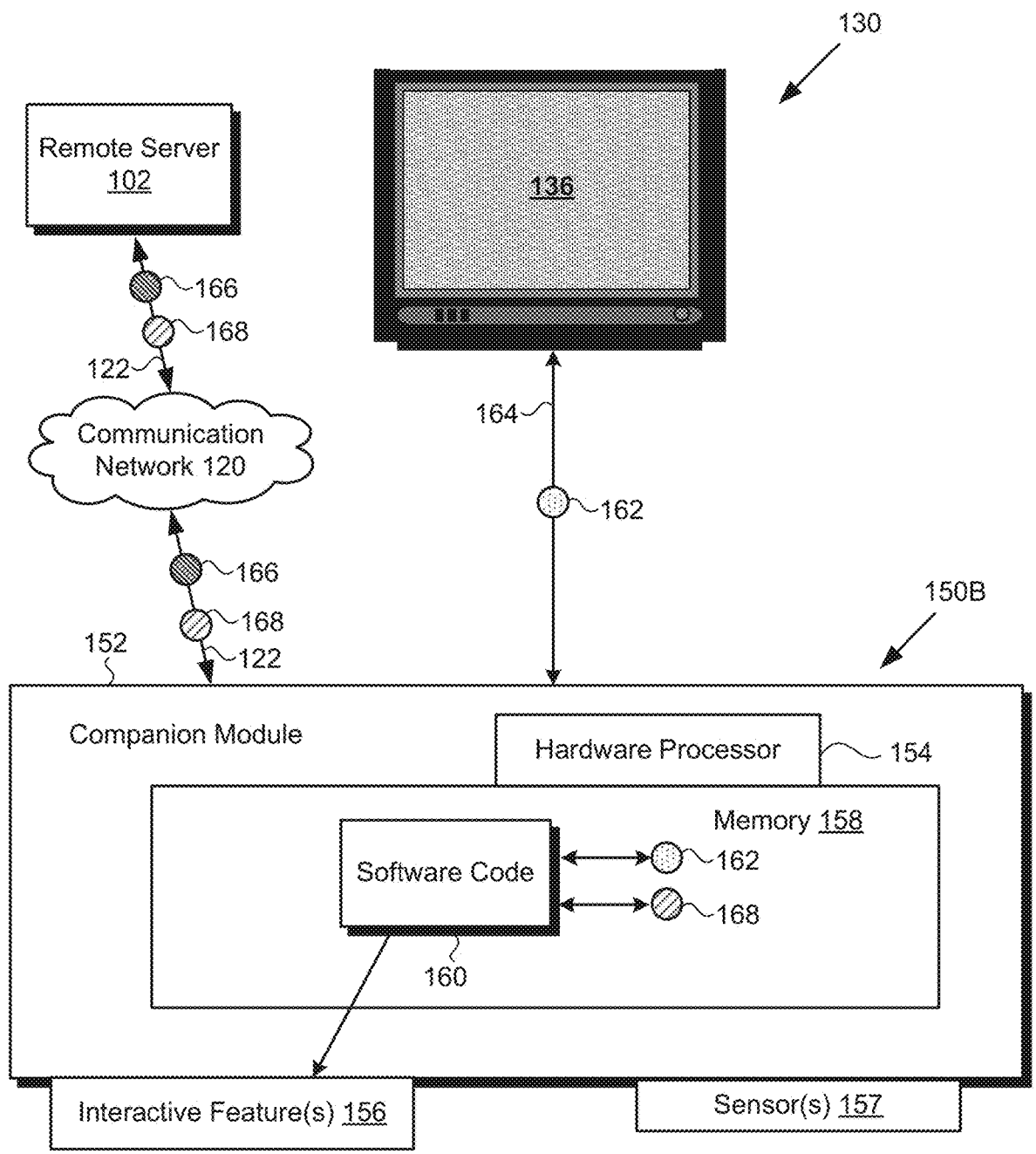
FIG. 1B shows a more detailed exemplary representation of the companion module included in the system of FIG. 1A, according to one implementation.

FIG. 1B shows a more detailed exemplary representation of companion module 150B suitable for use in system 100 and communicatively coupled to media player device 130 of system 100 by local wireless communication link 164, as well as to remote server 102 by communication network 120 and network communication links 122, according to one implementation. As shown in FIG. 1B, companion module 150B is a smart device including computing platform 152 having hardware processor 154, one or more interactive features 156 (hereinafter "interactive feature(s) 156"), one or more sensors 157 (hereinafter "sensor(s) 157"), and memory 158 implemented as a non-transitory storage device storing software code 160, media playout status metadata 162, and behavioral manifest data 168.

Also shown in FIG. 1B are output device 136 of media player device 130, interaction schema request 166, and media playout status metadata 162 received by companion module 150B via local wireless communication link 164.

It is noted that any feature in FIG. 1B identified by a reference number identical to a reference number shown in FIG. 1A corresponds respectively to that previously described feature. That is to say, any features in FIG. 1B described above by reference to FIG. 1A may share any of the characteristics attributed to those respective features above, while any feature shown in FIG. 1A and further described by reference to FIG. 1B may share any of the characteristics disclosed by reference to FIG. 1B. Moreover, companion module 150B, in FIG. 1B, corresponds in general to companion module 150, in FIG. 1A, and those corresponding features may share any of the characteristics attributed to either feature by the present disclosure. Thus, although not shown in FIG. 1A, companion module 150 in that figure may include features corresponding respectively to computing platform 152, hardware processor 154, interactive feature(s) 156, sensor(s) 157, and memory 158 storing software code 160, media playout status metadata 162, and behavioral manifest data 168.

Although the present application refers to software code 160 as being stored in memory 158 for conceptual clarity, more generally, memory 158 may take the form of any computer-readable non-transitory storage medium. The expression "computer-readable non-transitory storage medium." as used in the present application, refers to any medium, excluding a carrier wave or other transitory signal that provides instructions to hardware processor 154 of computing platform 152. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs such as DVDs, RAM, programmable read-only memory (PROM), erasable PROM (EPROM), and FLASH memory.

Regarding interactive feature(s) 156, it is noted that interactive feature(s) 156 may include output features for producing one or more of sound effects, lighting effects, and speech, for example. In addition, or alternatively, interactive feature(s) 156 may include one or more haptic actuators for generating haptic effects, as well as, in some implementations, a display. In addition, or as another alternative, interactive feature(s) 156 may include articulable limbs, one or more actuators for generating facial expressions for a robot or toy, as well as motor controlled tracks or wheels enabling locomotion by companion module 150B.

Sensor(s) 157 may include one or more microphones and one or more cameras, such as red-green-blue (RGB) still image cameras or video cameras, for example. In addition, in some implementations, sensor(s) 157 may include one or more of a facial recognition (FR) sensor, an automatic speech recognition (ASR) sensor, and an object recognition (OR) sensor. As noted above, companion module 150B is communicatively coupled to remote server 102 by communication network 120 and network communication links 122, and to media player device 130 by local wireless communication link 164. As a result, in some implementations, companion module 150B may utilize data obtained from sensor(s) 157 to influence behavioral manifest data 168 or playout of media content 116. For example, if user 126 were to raise companion module 150B high in the air during playout of a portion of media content 116, that elevation of companion module 150B could be sensed by sensor(s) 157 and could trigger a change to the way in which media content 116 is being played out.

Thus, communication between companion module 150B and each of remote server 102 and media player device 130 may be bidirectional.

Hardware processor 154 may be the central processing unit (CPU) for companion module 150B, for example, in which role hardware processor 154 executes software code 160 and controls interactive feature(s) 156 and sensor(s) 157. Software code 160, when executed by hardware processor 154, may be configured to obtain behavioral manifest data 168, receive media playout status metadata 162, and guide interactions between companion module 150B and user 126 in FIG. 1A, while media content 116 is played out by media player device 130, so as to provide user 126 with a more engaging and immersive enhanced media content consumption experience.

Figure 1C:
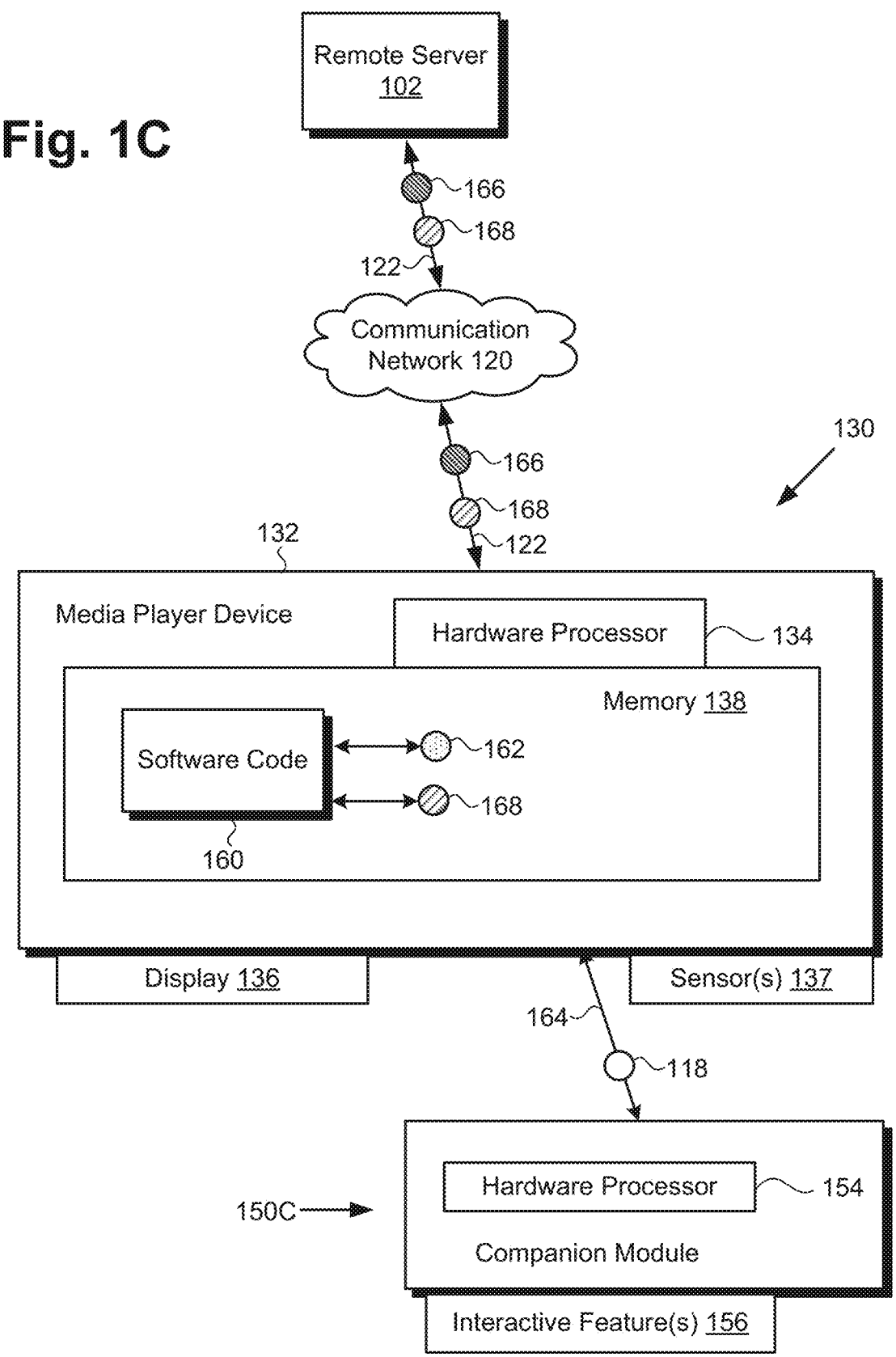
FIG. 1C shows a more detailed exemplary representation of the media player device included in the system of FIG. 1A in combination with a companion module, according to another implementation.

FIG. 1C shows a more detailed exemplary representation of media player device 130 included in system 100 of FIG. 1A, communicatively coupled to companion module 150C of system 100 by local wireless communication link 164, as well as to remote server 102 by communication network 120 and network communication links 122, according to another implementation. As shown in FIG. 1C, media player device 130 includes computing platform 132 having hardware processor 134, output device 136, one or more sensors 137 (hereinafter "sensor(s) 137"), and memory 138 implemented as a non-transitory storage device storing software code 160, media playout status metadata 162, and behavioral manifest data 168. Also shown in FIG. 1C are hardware processor 154 and interactive feature(s) 156 of companion module 150, as well as interaction schema request 166, and one or more control signal(s) 118 (hereinafter "control signal(s) 118") transmitted to companion module 150C by media player device 130 via local wireless communication link 164.

It is noted that any feature in FIG. 1C identified by a reference number identical to reference numbers shown in FIGS. 1A and 1B corresponds respectively to that previously described feature. That is to say, any features in FIG. 1C described above by reference to FIG. 1A or 1B may share any of the characteristics attributed to those respective features above, while any feature shown in FIG. 1A or 1B and further described by reference to FIG. 1C may share any of the characteristics disclosed by reference to FIG. 1C. Thus, although not shown in FIG. 1A or 1B, media player device 130 in those figures may include features corresponding respectively to computing platform 132, hardware processor 134, and memory 138 storing software code 160, media playout status metadata 162, and behavioral manifest data 168. It is further noted that although the present application refers to software code 160 as being stored in memory 138 for conceptual clarity, more generally, memory 138 may take the form of any computer-readable non-transitory storage medium, as described above by reference to memory 158 of companion module 150B, in FIG. 1B.

Companion module 150C, in FIG. 1C, corresponds in general to companion module 150, in FIG. 1A, and those corresponding features may share any of the characteristics attributed to either feature by the present disclosure. Thus, as shown in FIG. 1C, in some implementations, companion module 150C may lack smart device features, and may not be configured to execute software code 160.

Hardware processor 134 may be the CPU for media player device 130, in which role hardware processor 134 executes software code 160 and controls sensor(s) 137. Sensor(s) 137 may include one or more microphones and one or more cameras, such as RGB still image cameras or video cameras, for example. In addition, in some implementations, sensor(s) 137 may include one or more of an FR sensor, an ASR sensor, and an object OR sensor. As noted above, media player device 130 is communicatively coupled to remote server 102 by communication network 120 and network communication links 122, and to companion module 150C by local wireless communication link 164. As a result, in some implementations, media player device 130 may utilize data obtained from sensor(s) 137 to influence behavioral manifest data 168 or playout of media content 116. For instance, referring to the example use case described above by reference to FIG. 1B in which user 126 raises companion module 150C high in the air during playout of a portion of media content 116, that elevation of companion module 150C could be sensed by sensor(s) 137 of media player device 130, and could trigger a change to the way in which media content 116 is being played out.

Software code 160, when executed by hardware processor 134, may obtain behavioral manifest data 168, receive media playout status metadata 162, and guide interactions between companion module 150C and user 126 in FIG. 1A using control signal(s) 118, while media content 116 is played out by media player device 130, so as to provide user 126 with a more engaging and immersive enhanced media content consumption experience.

The functionality of system 100 including media player device 130 and companion module 150, as well as that of software code 160 will be further described by reference to FIG. 2 in combination with FIGS. 1A, 1B. 1C, and 3. FIG. 2 shows flowchart 270 presenting an exemplary method for guiding interactions between a companion module and a user, according to one implementation. With respect to the method outlined in FIG. 2, it is noted that certain details and features have been left out of flowchart 270 in order not to obscure the discussion of the inventive features in the present application.

Figure 3:
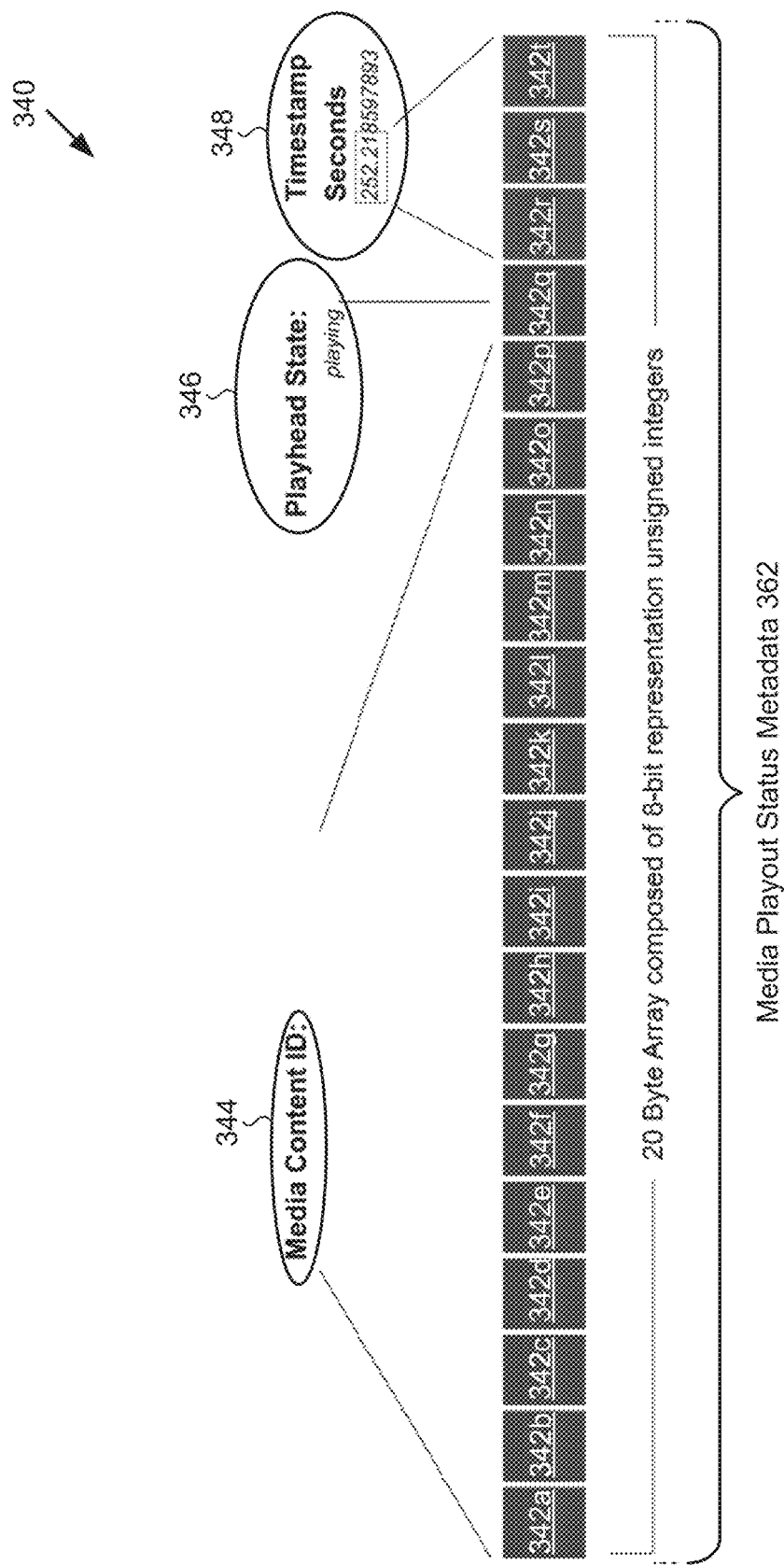
FIG. 3 shows an exemplary data frame suitable for use by a system for guiding interactions between a companion module and a user, according to one implementation.

FIG. 3 shows exemplary data frame 340 having media playout status metadata 362 embedded therein, and suitable for use by system 100 in FIG. 1A for guiding interactions between companion module 150 and user 126, according to one implementation. It is noted that media playout status metadata 362 corresponds in general to media playout status metadata 162, in Figures A. 1B, and 1C. As a result, media playout status metadata 362 may share any of the characteristics attributed to media playout status metadata 162 by the present disclosure, and vice versa. Thus, data frame 340 may serve as a data frame for transmitting media playout status metadata 162/362 from media player device 130 to companion module 150, as shown in FIGS. 1A and 1B. It is further noted that media player device 130 is configured to generate, format, and read data frame 340, while companion module 150 is configured to parse data frame 340 according to format shown in FIG. 3, to read each corresponding byte, and to execute interactive feature(s) based on the values of each byte and behavioral manifest data 168.

As shown in FIG. 3, according to one exemplary implementation, media playout status metadata 162/362 includes multiple bytes 342a, 342b, 342c, 342d, 342e, 342f, 342g, 342h. 342i, 342j, 342k. 342l, 342m, 342n. 342o, and 342p (hereinafter "bytes 342a-342p") embedded in data frame 340. As further shown in FIG. 3, bytes 342a-342p may be used to identify media content ID 344 of media content 116. In addition to bytes 342a-342p identifying media content 116, media playout status metadata 162/362 includes at least one byte 342q embedded in data frame 340 and identifying play head state 346 of media player device 130. Moreover and as also shown in FIG. 3, media playout status metadata 162/362 further includes multiple bytes 342r, 342s, and 342t embedded in data frame 340 and identifying playout timecode state 348, i.e., a present playout timestamp of the timecode of media content 116.

It is noted that the number of bytes of data frame 340 dedicated to each of media content ID 344, play head state 346, and playout timecode state 348 in the implementation shown in FIG. 3 is merely exemplary. In other implementations, fewer, or more, than bytes 342a-342p may provide media content ID 344. Analogously, in other implementations, more than single byte 342q may be used to identify play head state 346, while more or fewer than bytes 342r, 342s, and 342t may be used to identify playout timecode state 348. It is further noted that in addition to play head state 346, i.e., play, pause, stop, fast-forward, reverse, and playout speed, in some implementations, byte 342q may further identify one or more of whether media player device 130 includes a display screen, i.e., output device 136, whether media player device 130 is in a muted mode, or whether media player device 130 is in a parental control mode that restricts playout of adult themed content.

According to the exemplary implementation shown in FIG. 3, data frame 340 is limited to twenty bytes. That is to say, in some implementations, data frame 340 includes not more than twenty bytes. It is noted that media playout status metadata 162/362 embedded in data frame 340 may be formatted for transmission using any one of a number of different wireless transmission protocols. For instance, in some implementations, media playout status metadata 162/362 may be formatted for transmission via a Bluetooth protocol, such as Bluetooth LE for example. Alternatively, in other implementations, media playout status metadata 162/362 may be formatted for transmission via one of WiFi, ZigBee, or 60 GHz wireless communications protocols.

Referring now to FIG. 2 in combination with FIGS. 1A, 1B, 1C, and 3, flowchart 270 begins with identifying media content 116 for playout by media player device 130 (action 271). Media content 116 may be video content or audio-video (AV) content from a linear TV program stream, for example, including an HD or UHD baseband video signal. Alternatively, in some implementations, media content 116 may be video content or AV content from a video game, or may be non-video audio content, such as music content, for example. It is noted that in various implementations, media content 116 may be received from content source 112, content distribution network 114, or may be persistently stored in memory 138 of media player device 130.

In implementations in which companion module 150 has smart device capabilities and the features shown by companion module 150B in FIG. 1B, hardware processor 154 of computing platform 152 may execute software code 160 stored in memory 158 of companion module 150B to identify media content 116 for playout by media player device 130 based on media content ID 344 received from media player device 130 via local wireless communication link 164. Alternatively, in implementations in which companion module 150 lacks smart device functionality, as shown in FIG. 1C, hardware processor 134 of media player device 130 may execute software code 160 stored in memory 138 of media player device 130 to identify media content 116 based on a media content ID included in media content 116, such as an Entertainment Identifier Registry identification (EIDR ID), for example.

Flowchart 270 continues with transmitting, to remote server 102, interaction schema request 166 identifying media content 116 and companion module 150 (action 272). Behavioral interaction schemas 108a. 108b, and 110 include instructions for guiding the interaction between companion module 150 and user 126 that are conditioned on attributes of media content 116, interactive feature(s) 156 of companion module 150, the playout status of media content 116, as well as one or more of actions performed by user 126, known preferences of user 126 or other user related metadata stored in user profile 128 of user 126, and the presence and interactive behavior of other users or companion modules associating with user 126. As noted above, each of interaction schemas 108a. 108b, and 110 may include a complete script of interactions between companion module 150 and user 126 during playout of media content 116 by media player device 130 that is updateable in real-time.

In some use cases, as noted above, it may be advantageous or desirable to have alternative versions of an interaction schema directed to the same media content but differing based on the factors described above. For example, interaction schema 108a may be directed to media content 116 and may be utilized in use cases in which companion module 150 is smart companion module 150B having data processing capabilities sufficient to support communications with remote server 102 and to control interactive feature(s) 156. By contrast, interaction schema 108b, while also being directed to media content 116, may be utilized in use cases in which companion module 150C is not a smart device, but one that lacks data processing capabilities enabling communications with remote server 102 and is instead controlled by media player device 130.

In other use cases, it may be advantageous or desirable to include all versions of an interaction schema included as alternative instructions within a single consolidated interaction schema, such as interaction schema 110. As noted above, in implementations in which interaction schema 110 takes the form of a consolidated interaction schema including alternative instructions, interaction schema 110 is effectively a general behavior guideline for interactions between companion module 150 and user 126 that is utilized in conjunction with real-time media playout status metadata 162.

In implementations in which companion module 150 takes the form of companion module 150B having the smart device features shown in FIG. 1B, hardware processor 154 of computing platform 152 may execute software code 160 stored in memory 158 of companion module 150B to transmit interaction schema request 166 identifying media content 116 and companion module 150B to remote server 102 via communication network 120. Alternatively, in implementations in which companion module 150 lacks smart device functionality, as shown in FIG. 1C, hardware processor 134 of media player device 130 may execute software code 160 stored in memory 138 of media player device 130 to transmit interaction schema request 166 identifying media content 116 and companion module 150C to remote server 102 via communication network 120.

Flowchart 270 continues with receiving, from remote server 102, behavioral manifest data 168 including an instruction for guiding the interaction between companion module 150 and user 126 (action 273). As noted above, in some implementations, behavioral manifest data 168 may include one of interaction schemas 108a. 108b, or 110 in its entirety, such as in the form of a download via communication network 120, for example. However, in other implementations, behavioral manifest data 168 may be transmitted in real-time synchronization with respect to the playout status of media content 116 by media player device 130, for example by being streamed over communication network 120. It is noted that in implementations in which behavioral manifest data 168 is obtained from consolidated interaction schema 110 including alternative interaction schema versions, behavioral manifest data 168 may include multiple alternative instructions conditioned upon factors such as actions performed by user 126, known preferences of user 126 or other user related metadata stored in user profile 128 of user 126, features of companion module 150, attributes of media content 116, and the playout status of media content 116.

In implementations in which companion module 150 has smart device capabilities and the features shown in FIG. 1B, hardware processor 154 of computing platform 152 may execute software code 160 stored in memory 158 of companion module 150B to receive behavioral manifest data 168 from remote server 102 via communication network 120.

Alternatively, in implementations in which companion module 150 lacks smart device functionality, as shown in FIG. 1C, hardware processor 134 of media player device 130 may execute software code 160 stored in memory 138 of media player device 130 to receive behavioral manifest data 168 from remote server 102 via communication network 120.

Flowchart 270 continues with obtaining play head state 346 of media player device 130 and playout timecode state 348 of media content 116 (action 274). In implementations in which companion module 150 has smart device capabilities and the features shown in FIG. 1B, hardware processor 154 of companion module computing platform 152 may execute software code 160 stored in memory 158 of companion module 150B to obtain play head state 346 and playout timecode state 348. For example, in some implementations, companion module 150 may be configured to determine play head state 346 of media player device 130 and playout timecode state 348 of media content 116 based on audio or visual recognition of media content 116. Alternatively, in some implementations, companion module 150 may be configured to determine play head state 346 of media player device 130 and playout timecode state 348 of media content 116 based on a watermark included in media content 116.

In yet other implementations, obtaining play head status 346 of media player device 130 and playout timecode status 348 of media content 116 may include receiving media playout status metadata 162/362 identifying play head status 346 and playout timecode status 348. Thus, in implementations in which companion module 150 has smart device capabilities, hardware processor 154 of companion module computing platform 152 may execute software code 160 stored in memory 158 of companion module 150B to receive media playout status metadata 162/362 from media player device 130 via local wireless communication link 164, or to otherwise obtain play head status 346 and playout timecode status 348 based on audio or visual recognition of media content 116 or on a watermark included in media content 116. However, in implementations in which companion module 150 lacks smart device functionality, as shown in FIG. 1C, hardware processor 134 of media player device 130 may execute software code 160 stored in memory 138 of media player device 130 to receive media playout status metadata 162/362 or otherwise obtain play head status 346 and playout timecode status 348 as one or more data transfers within memory 138.

In some implementations, flowchart 270 can continue and conclude with identifying a user interaction behavior for companion module 150 based on behavioral manifest data 168, play head status 346 of media player device 130, and playout timecode status 348 of media content 116 (action 275). In implementations in which companion module 150 has smart device capabilities and the features shown in FIG. 1B, hardware processor 154 of computing platform 152 may execute software code 160 stored in memory 158 of companion module 150B to perform action 275. Alternatively, in implementations in which companion module 150 lacks smart device functionality, as shown in FIG. 1C, hardware processor 134 of media player device 130 may execute software code 160 stored in memory 138 of media player device 130 to perform action 275. It is emphasized that action 275 is not the mere execution of a predetermined script, but includes a logic based identification of an appropriate interaction behavior by software code 160 based on what may be alternative instructions included in behavioral manifest data 168 in combination with real-time media play head status 346 of media player device 130 and playout timecode status 348 of media content 116.

In some implementations, hardware processor 154 of companion module 150B may execute software code 160 to detect an action by user 126, based on input from sensor(s) 157, for example. Alternatively, in implementations in which companion module 150 lacks smart device functionality, as shown in FIG. 1C, hardware processor 134 of media player device 130 may execute software code 160 stored in memory 138 of media player device 130 to detect an action by user 126 based on input from sensor(s) 137. Moreover, in implementations in which an action by user 126 is detected by companion module 150B or media player device 130, identification of the user interaction behavior for companion module 150 in action 275 may be further based on the detected action.

In implementations in which companion module 150 has smart device capabilities and the features shown in FIG. 1B, flowchart 270 can continue and conclude with optionally performing, by companion module 150B, the user interaction behavior identified in action 275 in real-time with respect to obtaining play head status 346 of media player device 130 and playout timecode status 348 of media content 116 in action 274 (action 276). For example, companion module 150B may utilize interactive feature(s) 156 to generate one or more of sound effects, lighting effects, haptic effects, speech, gestures, facial expressions, and movements appropriate to the playout state of media content 116. However, in implementations in which companion module 150 lacks smart device functionality, flowchart 270 can continue and conclude with optionally transmitting, by media player device 130, control signal(s) 118 to companion module 150C for performing the user interaction behavior identified in action 275 in real-time with respect to obtaining play head status 346 of media player device 130 and playout timecode status 348 of media content 116 in action 274 (action 277). For example, the user interaction behavior by companion module 150 as the result of optional actions 276 or 277 may be performed with a latency of less than approximately two seconds with respect to obtaining play head status 346 and playout timecode status 348 in action 274.

According to some implementations, hardware processor 154 of companion module 150B may execute software code 160 to perform actions 271, 272, 273, 274, and 275 (hereinafter "actions 271-275"), as well as optional action 276, in an automated process from which human involvement is omitted. Alternatively, in some implementations hardware processor 134 of media player device 130 may execute software code 160 to perform actions 271-275 and optional action 277 in an automated process.

Figure 4A:
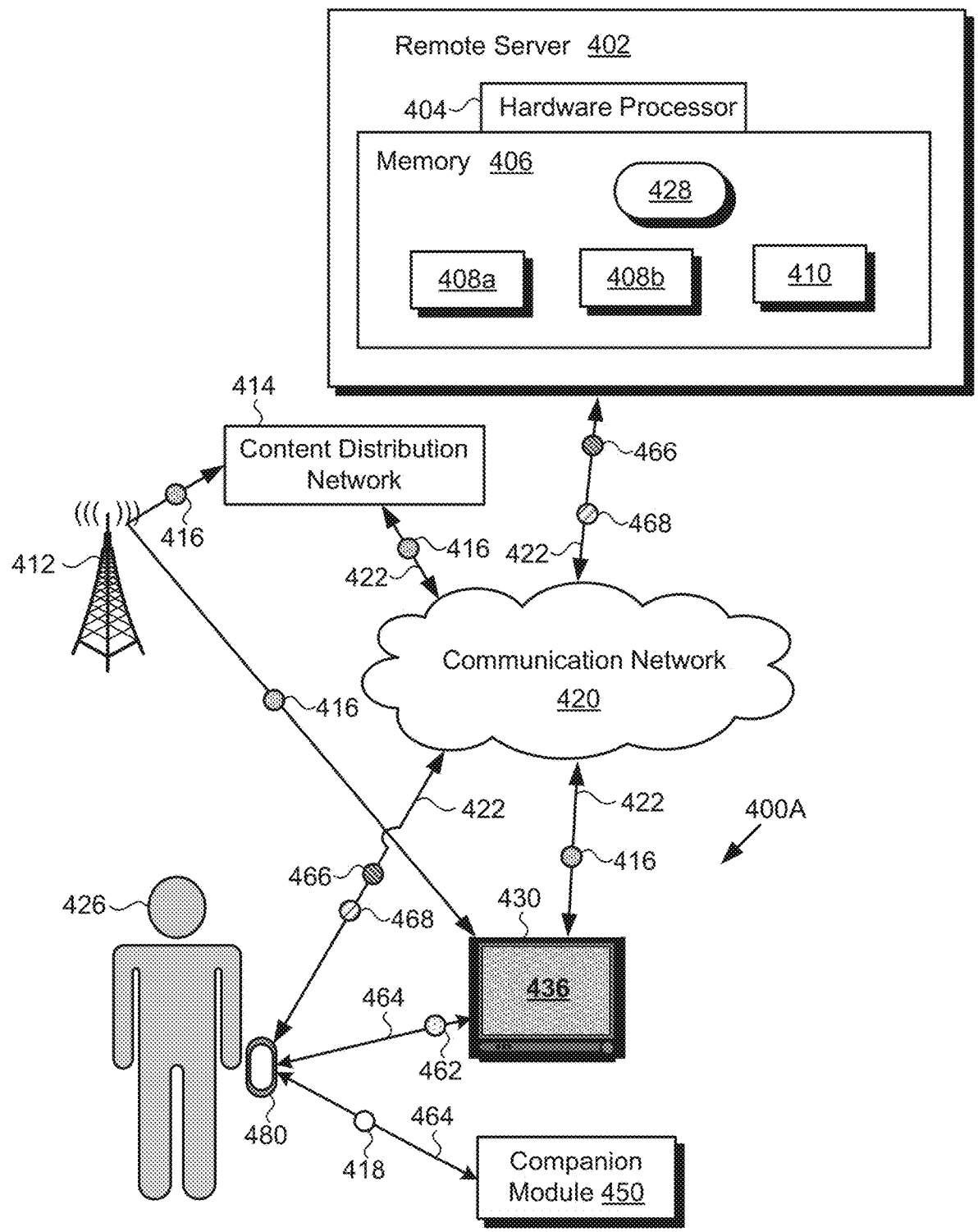
FIG. 4A shows an exemplary system for guiding interactions between a companion module and a user, according to another implementation.

FIG. 4A shows exemplary system 400A for guiding interactions between a companion module and a user, according to another implementation. As shown in FIG. 4A, system 400A may include exemplary media player device 430 having output device 436, companion module 450, and user device 480 configured to be communicatively coupled to media player device 430 and companion module 450 by local wireless communication links 464.

As further shown in FIG. 4A, system 400A is implemented within a use environment including content source 412 providing media content 416 for delivery to media player device 430, either as a direct linear TV broadcast or via content distribution network 414 and communication network 420. The use environment also includes remote computer server 402 (hereinafter "remote server 402") accessible to user device 480 via communication network 420. Remote server 402 includes hardware processor 404 and memory 406 implemented as a non-transitory storage device storing interaction schemas 408a, 408b, and 410. Also shown in FIG. 4A is user 426 of user device 480, media player device 430, and companion module 450, user profile 428 of user 426 that may optionally be stored on remote server 402, network communication links 422 of communication network 420, interaction schema request 466, behavioral manifest data 468, media playout status metadata 462, and one or more control signals 418 (hereinafter "control signal(s) 418").

Media player device 430 having output device 436, companion module 450, local wireless communication links 464, media playout status metadata 462, and control signal(s) 418 correspond respectively in general to media player device 130 having display 136, companion module 150, local wireless communication link 164, media playout status metadata 162, and control signal(s) 118 shown variously in FIG. 1A, 1B, and 1C.

Consequently, media player device 430, output device 436, companion module 450, local wireless communication links 464, media playout status metadata 462, and control signal(s) 418 may share any of the characteristics attributed to respective media player device 130, output device 136, companion module 150, local wireless communication link 164, media playout status metadata 162, and control signal(s) 118 by the present disclosure, and vice versa.

In addition, remote server 402, interaction schemas 408a, 408b, and 410, communication network 420, network communication links 422, interaction schema request 466, and behavioral manifest data 468, in FIG. 4A, correspond respectively in general to remote server 102, interaction schemas 108a, 108b, and 110, communication network 120, network communication links 122, interaction schema request 166, and behavioral manifest data 168, in FIGS. 1A, 1B, and 1C. Thus, remote server 402, interaction schemas 408a, 408b, and 410, communication network 420, network communication links 422, interaction schema request 466, and behavioral manifest data 468 may share any of the characteristics attributed to respective remote server 102, interaction schemas 108a, 108b, and 110, communication network 120, network communication links 122, interaction schema request 166, and behavioral manifest data 168 by the present disclosure, and vice versa. Moreover, content source 412, content distribution network 414, media content 416, and user 426 in FIG. 4A correspond respectively in general to content source 112, content distribution network 114, media content 116, and user 126, in FIG. 1A, and those corresponding features may share any of the characteristics attributed to either corresponding feature by the present disclosure.

It is noted that, although user device 480 is shown as a smartphone in FIG. 4A, that representation is provided merely by way of example. In other implementations, user device 480 may take the form of any suitable mobile or stationary computing device or system that implements data processing capabilities sufficient to provide a user interface, support connections to communication network 420, and implement the functionality ascribed to user device 480 herein. That is to say, in other implementations, user device 480 may take the form of a desktop computer, laptop computer, tablet computer, game console, or a wearable communication device such as a smartwatch, to name a few examples.

It is further noted that, in some implementations, user device 480 may take the form of an AR or VR viewing device, such as AR glasses or goggles, or a VR headset, for example. In those implementations, behavioral manifest data 468 may include AR or VR effects for rendering by user device 480, such as visual effects, sound effects, odors or aromas, or haptic effects, for example. In implementations in which user device 480 takes the form of AR glasses or goggles, the AR effects included in behavioral manifest data 468 may introduce additional virtual features to media content 416 when media content 416 is displayed by output device 436 of media player device 430. In addition, or alternatively, in such implementations, the AR effects included in behavioral manifest data 468 may include virtual effects to enhance the appearance of companion module 450 from the perspective of user 426. For example, AR effects included in behavioral manifest data 468 could appear to clothe companion module 450 in a costume, or to equip companion module 450 with one or more accessories such as a magic wand, light saber, jewelry, or headgear, for instance.

In implementations in which user device 480 takes the form of a VR headset, the VR effects included in behavioral manifest data 468 may also introduce additional virtual features to media content 416 when media content 416 is displayed to user 426. In addition, or alternatively, in such implementations, the VR effects included in behavioral manifest data 468 may alter the appearance of the environment in which companion module 450 interacts with user 426, as well as include a virtual version of companion module 450 capable of taking on substantially any appearance. Moreover, in implementations in which the VR effects included in behavioral manifest data 468 substantially reproduce the features of companion module 450, those VR effects may enable companion module 450 to appear to be able to move in ways that companion module 450 is physically incapable of. For instance, where companion module 450 is a material object in the form of a toy or other device, the VR effects included in behavioral manifest data 468 may cause companion module 450 to appear to leap into the air, or to fly around in the virtual environment in which companion module 450 and user 426 interact.

FIG. 4B shows a more detailed exemplary representation of user device 480 included in system 400A of FIG. 4A, communicatively coupled to media player device 430 and companion module 450 of system 400A by local wireless communication links 464, as well as to remote server 402 by communication network 420 and network communication links 422, according to one implementation. As shown in FIG. 4B, user device 480 includes computing platform 482 having hardware processor 484, one or more sensors 487 (hereinafter "sensor(s) 487"), and memory 488 implemented as a non-transitory storage device storing software code 460, media playout status metadata 462, and behavioral manifest data 468. Also shown in FIG. 4B are output device 436 of media player device 430, hardware processor 454 and one or more interactive features 456 (hereinafter "interactive feature(s) 456") of companion module 450, media playout status metadata 462 that may be received by user device 480 from media player device 430 via local wireless communication link 464, interaction schema request 466, and control signal(s) 418 received by companion module 450 from user device 480 via local wireless communication link 464.

It is noted that any feature in FIG. 4B identified by a reference number identical to a reference number shown in FIG. 4A corresponds respectively to that previously described feature. That is to say, any features in FIG. 4B described above by reference to FIG. 4A may share any of the characteristics attributed to those respective features above, while any feature shown in FIG. 4A and further described by reference to FIG. 4B may share any of the characteristics disclosed by reference to FIG. 4B. Thus, although not shown in FIG. 4A, user device 480 in that figure may include features corresponding respectively to computing platform 482, hardware processor 484, and memory 488 storing software code 460, media playout status metadata 462, and behavioral manifest data 468, while companion module 450 in FIG. 4A may include hardware processor 454 and interactive feature(s) 456.

It is noted that although the present application refers to software code 460 as being stored in memory 488 of user device 480 for conceptual clarity, more generally, memory 488 may take the form of any computer-readable non-transitory storage medium, as described above by reference to FIG. 1B. It is further noted that interactive feature(s) 456 of companion module 450 and software code 460 correspond respectively to interactive feature(s) 156 of companion module 150 and software code 160 in FIGS. 1B and 1C. That is to say, interactive feature(s) 456 of companion module 450 and software code 460 may share any of the characteristics attributed to respective interactive feature(s) 156 of companion module 150 and software code 160 by the present disclosure, and vice versa. Thus, interactive feature(s) 456 may include output features for producing one or more of sound effects, lighting effects, and speech, for example. In addition, or alternatively, interactive feature(s) 456 may include one or more haptic actuators for generating haptic effects, as well as, in some implementations, a display. In addition, or as another alternative, interactive feature(s) 456 may include articulable limbs, one or more actuators for generating facial expressions for a robot or toy, as well as motor controlled tracks or wheels enabling locomotion by companion module 450.

It is further noted that sensor(s) 487 of user device 480 may include one or more microphones and one or more cameras, such as RGB still image cameras or video cameras, for example. In addition, in some implementations, sensor(s) 487 may include one or more of an FR sensor, an ASR sensor, and an OR sensor. As noted above, user device 480 is communicatively coupled to remote server 402 by communication network 420 and network communication links 422, and to media player device 430 and companion module 450 by local wireless communication links 464. As a result, in some implementations, user device 480 may utilize data obtained from sensor(s) 487 to influence behavioral manifest data 468 or playout of media content 416. For instance, returning to the example use case described above by reference to FIGS. 1B and 1C in which user 426 raises companion module 450 high in the air during playout of a portion of media content 416, that elevation of companion module 450 could be sensed by sensor(s) 487 of user device 480, and could trigger a change to the way in which media content 416 is being played out.

Hardware processor 484 may be the central processing CPU for user device 480, for example, in which role hardware processor 484 executes software code 460 and controls sensor(s) 457. According to the exemplary implementation shown by FIGS. 4A and 4B, user device 480 is configured to perform actions 271-275 and optional action 277 of flowchart 270. That is to say, software code 460, when executed by hardware processor 484, may be configured to identify media content 416 for playout by media player device 430, transmit, to remote server 402, interaction schema request 466 identifying media content 416 and companion module 450, and receive, from remote server 402, behavioral manifest data 468. In addition, hardware processor 484 may execute software code 460 to obtain play head state 346 of media player device 430 and playout timecode state 348 of media content 416, and identify a user interaction behavior for companion module 450 based on behavioral manifest data 468, play head state 346 of media player device 430, and playout timecode state 348 of media content 416. Moreover, hardware processor 484 may further execute software code 460 to transmit, to companion module 450, control signal(s) 418 for performing the identified user interaction behavior in real-time with respect to obtaining play head state 346 and playout timecode state 348, while media content 416 is played out by media player device 430, so as to provide user 426 with a more engaging and immersive enhanced media content consumption experience.

It is noted that in some implementations in which companion module 450 takes the form of a software module, companion module 450 may be a software module included in software code 460 stored in memory 488 of user device 480. Alternatively, in implementations in which an AR, VR, or holographic virtual companion is rendered by media player device 430, companion module 450 may be a module of software code stored on media player device 430.

Figure 4C:
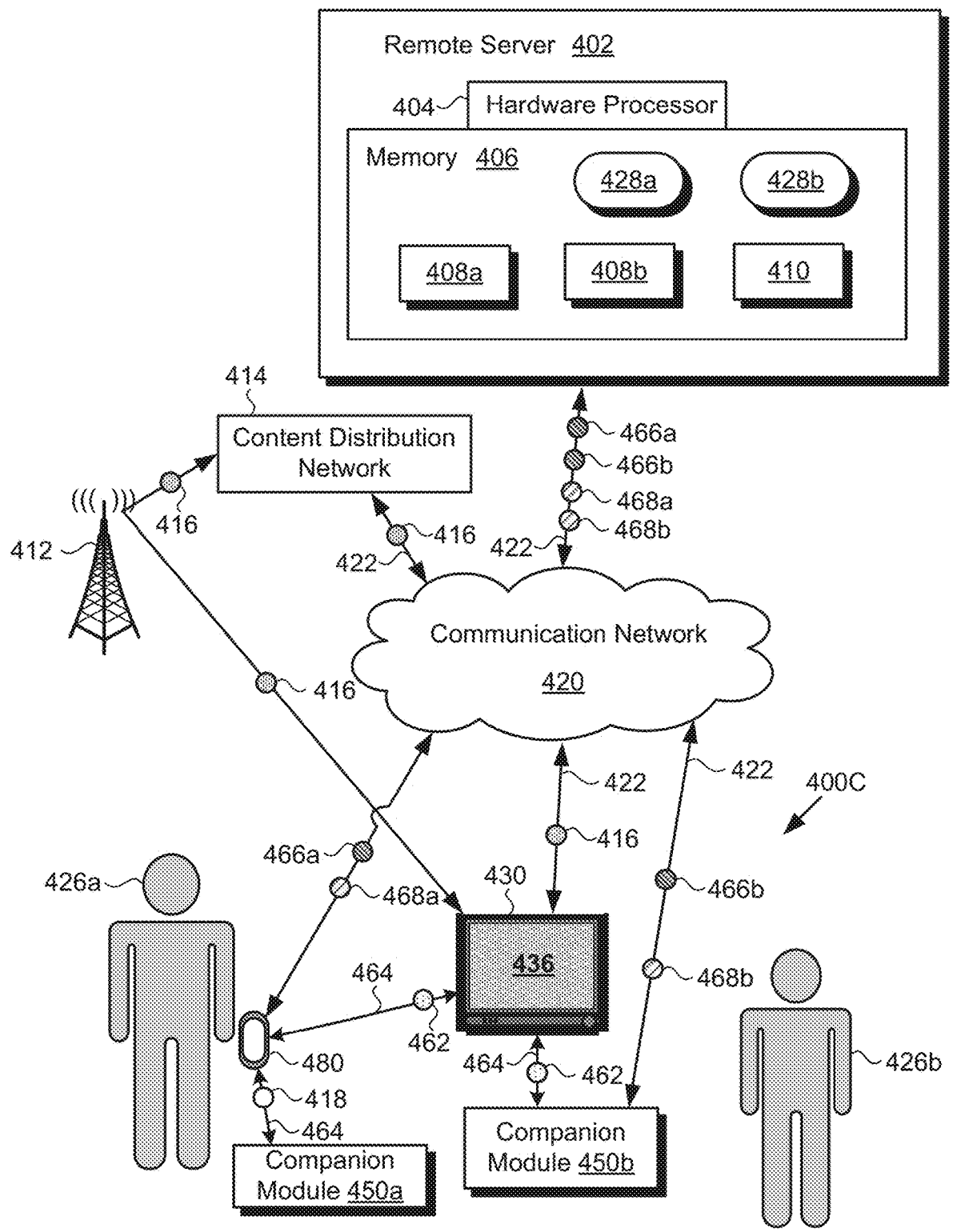
FIG. 4C shows an exemplary system for guiding interactions between a companion module and a user, according to yet another implementation.

FIG. 4C shows exemplary system 400C for guiding interactions between a companion module and a user, according to yet another implementation. It is noted that any feature in FIG. 4C identified by a reference number identical to reference numbers shown in FIGS. 4A and 4B corresponds respectively to that previously described feature. That is to say, any features in FIG. 4C described above by reference to FIG. 4A or 4B may share any of the characteristics attributed to those respective features above. As shown in FIG. 4C, system 400C includes multiple companion modules 450a and 450b, and is implemented in a use environment including multiple user 426a and 426b, user profiles 428a and 428b of respective users 426a and 426b, multiple interaction schema requests 466a and 466b, and multiple instances of behavioral manifest data 468a and 468b.

Companion modules 450a and 450b correspond in general to companion module 150/450 and may share any of the characteristics attributed to that corresponding feature by the present disclosure. In addition, interaction schema requests 466a and 466b, in FIG. 4C, analogously correspond to interaction schema request 166/466 in FIGS. 1A and 4A, while behavioral manifest data 468a and 468b analogously correspond to behavioral manifest data 168/468.

According to the exemplary implementation shown in FIG. 4C, companion module 450b is a smart device corresponding to companion module 150B, in FIG. 1B, while companion module 450a lacks smart device features and corresponds to companion module 150C, in FIG. 1C. Consequently, user device 480 is configured to perform actions 271-275 and optional action 277 of flowchart 270 to guide interactions by companion module 450a, while companion module 450b is configured to perform actions 271-275 and optional action 276. That is to say, user device 480 may be utilized by user 426a to identify media content 416 for playout by media player device 430, transmit, to remote server 402, interaction schema request 466a identifying media content 416 and companion module 450a, and receive, from remote server 402, behavioral manifest data 468a. In addition, user device 480 may receive media playout status metadata 462 identifying play head state 346 of media player device 430 and playout timecode state 348 of media content 416, and identify, in response to receiving media playout status metadata 462, a user interaction behavior for companion module 450a based on behavioral manifest data 468a and media playout status metadata 462. Moreover, user device 480 may transmit, to companion module 450a, control signal(s) 418 for performing the identified user interaction behavior in real-time with respect to receiving media playout status metadata 462.

Substantially concurrently with performance of actions 261-265 and optional action 277 by user device 480, smart companion module 450b also identifies media content 416 for playout by media player device 430, transmits, to remote server 402, interaction schema request 466b identifying media content 416 and companion module 450b, and receives, from remote server 402, behavioral manifest data 468b. In addition, companion module 450b may receive media playout status metadata 462 identifying play head state 346 of media player device 430 and playout timecode state 348 of media content 416, and identifies, in response to receiving media playout status metadata 462, a user interaction behavior for companion module 450b based on behavioral manifest data 468b and media playout status metadata 462, and may perform the identified user interaction behavior in real-time with respect to receiving media playout status metadata 462.

As noted above, in some implementations, behavioral manifest data such as behavioral manifest data 468a and 468b may include one of interaction schemas 408a, 408b, or 410 in its entirety, such as in the form of a download via communication network 420, for example. However, in other implementations, behavioral manifest data 468a and 468b may be transmitted in real-time synchronization with respect to the playout status of media content 416 by media player device 430, for example by being streamed over communication network 420. It is noted that in implementations in which behavioral manifest data 468a and 468b is obtained from consolidated interaction schema 410 including alternative interaction schema versions, each of behavioral manifest data 468a and 468b may include multiple alternative instructions conditioned upon factors such as actions performed by either or both of users 426a and 426b, known preferences of one or more of users 426a and 426b or other user related metadata stored in user profiles 428a and 428b of respective users 426a and 426b, features of companion modules 450a and 450b, attributes of media content 416, and the playout status of media content 416.

In implementations such as system 400C including multiple companion modules 450a and 450b, behavioral manifest data 468a and 468b may include instructions for coordinating the user interaction behavior of each of companion modules 450a and 450b. As a result, in those implementations, companion modules 450a and 450b may appear to interact with one another, as well as with one or more of users 426a and 426b. Furthermore, in use environments including multiple users 426a and 426b, behavioral manifest data 468a and 468b may include instructions for guiding interactions between one or more of companion modules 450a and 450b and users 426a and 426b individually, as well as instructions for guiding an interaction between one or more of companion modules 450a and 450b and users 426a and 426b collectively. That is to say, when users 426a and 426b are present as a group, behavioral manifest data 468a and 468b may include instructions for guiding an interaction between a companion module and individual members of the group, as well as instructions for guiding an interaction between the companion module and the group as a whole.

Thus, the present application discloses systems and methods for guiding interactions between a companion module and a user that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method of guiding interactions with a user, the method comprising:

identifying, by one of a media player or a companion module in wireless communication with the media player, a media content for a playout by the media player, the companion module including at least one of a software or hardware component;

transmitting, to a remote server by the one of the companion module or the media player, an interaction schema request identifying the media content and the companion module;

receiving, from the remote server by the one of the companion module or the media player, in response to transmitting the interaction schema request to the remote server, a behavioral manifest data guiding the interactions between the companion module and the user during the playout of the media content by the media player, the behavioral manifest data including a plurality of alternative interaction schema versions each including a respective script of the interactions between the companion module and the user, the plurality of alternative interaction schema versions being conditioned upon a playout status of the media content;

obtaining, by the one of the companion module or the media player, a play head state of the media player and a playout timecode state of the media content; and identifying, by the one of the companion module or the media player, a user interaction behavior for performance by the companion module based on the behavioral manifest data including the plurality of alternative interaction schema versions conditioned upon the playout status of the media content, the play head state of the media player device, and the playout timecode state of the media content.

2. The method of claim 1, wherein the one of the companion module or the media player is the companion module, and wherein the method further comprises:

performing, by the companion module, the identified user interaction behavior in real-time with respect to the obtaining of the play head state of the media player and the playout timecode state of the media content.

3. The method of claim 1, wherein the one of the companion module or the media player is the media player, and wherein the method further comprises:

transmitting, by the media player to the companion module, a control signal for performing the identified user interaction behavior in real-time with respect to the obtaining of the play head state of the media player and the playout timecode state of the media content.

4. The method of claim 1, wherein the user is one of a plurality of users, and wherein the plurality of alternative interaction schema versions include a first interaction schema instruction for guiding the interactions between the companion module and the plurality of users individually, and the plurality of alternative interaction schema versions further include a second interaction schema instruction for guiding the interactions between the companion module and the plurality of users as a whole.

5. The method of claim 1, wherein the companion module is one of a plurality of companion modules, and wherein the plurality of alternative interaction schema versions include an interaction schema instruction for coordinating the user interaction behavior of each of the plurality of companion modules.

6. The method of claim 1, further comprising:

detecting, by the one of the companion module or the media player, an action by the user;

wherein identifying the user interaction behavior for the companion module is further based on the detected action.

7. The method of claim 1, wherein the one of the companion module or the media player is the companion module, and wherein obtaining the play head state of the media player and the playout timecode state of the media content comprises:

receiving a media playout status metadata including:
first one or more bytes, embedded in a data frame, identifying the media content;
second one or more bytes, embedded in the data frame, identifying the play head state of the media player; and
third one or more bytes, embedded in the data frame, identifying the playout timecode state of the media content.

8. The method of claim 7, wherein the second one or more bytes further identify at least one of: a playout speed of the media player, whether the media player includes a display screen, whether the media player is in a muted mode, or whether the media player is in a parental control mode.

9. The method of claim 7, wherein the media playout status metadata is formatted for transmission via Bluetooth Low Energy, and wherein the data frame comprises not more than twenty bytes.

10. A system for guiding interactions with a user, the system comprising:

a computing platform of one of a media player or a companion module in wireless communication with the media player, the computing platform including a hardware processor and a memory, the companion module including at least one of a software or hardware component;

a software code stored in the memory;

the hardware processor configured to execute the software code to:
identify a media content for a playout by the media player;
transmit, to a remote server, an interaction schema request identifying the media content and the companion module;
receive, from the remote server, in response to transmitting the interaction schema request to the remote server, a behavioral manifest data guiding the interactions between the companion module and the user during the playout of the media content by the media player, the behavioral manifest data including a plurality of alternative interaction schema versions each including a respective script of the interactions between the companion module and the user, the plurality of alternative interaction schema versions being conditioned upon a playout status of the media content;
obtaining a play head state of the media player and a playout timecode state of the media content; and
identify a user interaction behavior for performance by the companion module, based on the behavioral manifest data including the plurality of alternative interaction schema versions conditioned upon the playout status of the media content, the play head state of the media player, and the playout timecode state of the media content.

11. The system of claim 10, wherein the computing platform is of the companion module, and wherein the hardware processor is further configured to execute the software code to:

perform the identified user interaction behavior in real-time with respect to the obtaining of the play head state of the media player and the playout timecode state of the media content.

12. The system of claim 10, wherein the computing platform is of the media player, and wherein the hardware processor is further configured to execute the software code to:

transmit, to the companion module, a control signal for performing the identified user interaction behavior in real-time with respect to the obtaining of the play head state of the media player and the playout timecode state of the media content.

13. The system of claim 10, wherein the user is one of a plurality of users, and wherein the plurality of alternative interaction schema versions include a first interaction schema instruction for guiding the interactions between the companion module and the plurality of users individually, and the plurality of alternative interaction schema versions further includes a second interaction schema instruction for guiding the interactions between the companion module and the plurality of users as a whole.

14. The system of claim 10, wherein the companion module is one of a plurality of companion modules, and wherein the plurality of alternative interaction schema versions include an interaction schema instruction for coordinating the user interaction behavior of each of the plurality of companion modules.

15. The system of claim 10, wherein the hardware processor is further configured to execute the software code to:
    detect an action by the user;
    wherein identifying the user interaction behavior for the companion module is further based on the detected action.

16. The system of claim 10, wherein the computing platform is of the companion module, and wherein obtaining the play head state of the media player and the playout timecode state of the media content comprises:
    receiving a media playout status metadata including:
        first one or more bytes, embedded in a data frame, identifying the media content;
        second one or more bytes, embedded in the data frame, identifying the play head state of the media player; and
        third one or more bytes, embedded in the data frame, identifying the playout timecode state of the media content.

17. The system of claim 16, wherein the second one or more bytes further identify at least one of: a playout speed of the media player, whether the media player includes a display screen, whether the media player is in a muted mode, or whether the media player is in a parental control mode.

18. The system of claim 16, wherein the media playout status metadata is formatted for transmission via Bluetooth Low Energy, and wherein the data frame comprises not more than twenty bytes.

* * * * *